US007911513B2

(12) United States Patent
Garrison et al.

(10) Patent No.: US 7,911,513 B2
(45) Date of Patent: Mar. 22, 2011

(54) SIMULATING SHORT DEPTH OF FIELD TO MAXIMIZE PRIVACY IN VIDEOTELEPHONY

(75) Inventors: William J. Garrison, Warminster, PA (US); Albert Fitzgerald Elcock, Havertown, PA (US)

(73) Assignee: General Instrument Corporation, Horsham, PA (US)

( * ) Notice: Subject to any disclaimer, the term of this patent is extended or adjusted under 35 U.S.C. 154(b) by 456 days.

(21) Appl. No.: 11/737,813

(22) Filed: Apr. 20, 2007

(65) Prior Publication Data

US 2008/0259154 A1    Oct. 23, 2008

(51) Int. Cl.
 *H04N 5/262* (2006.01)
(52) U.S. Cl. ....................................................... 348/239
(58) Field of Classification Search .................. 348/586, 348/239
 See application file for complete search history.

(56) References Cited

U.S. PATENT DOCUMENTS

| | | | |
|---|---|---|---|
| 5,384,615 A | 1/1995 | Hsieh et al. | |
| 6,148,113 A | 11/2000 | Wolverton et al. | |
| 6,590,571 B2 | 7/2003 | Laffargue et al. | |
| 6,950,130 B1 * | 9/2005 | Qian | 348/239 |
| 7,227,567 B1 * | 6/2007 | Beck et al. | 348/14.07 |
| 2002/0079425 A1 | 6/2002 | Rhoads | |
| 2004/0120584 A1 * | 6/2004 | Jang et al. | 382/232 |
| 2006/0193509 A1 * | 8/2006 | Criminisi et al. | 382/154 |
| 2007/0053513 A1 | 3/2007 | Hoffberg | |
| 2007/0237393 A1 * | 10/2007 | Zhang et al. | 382/173 |

OTHER PUBLICATIONS

Erik Hjelmas et al, "Face Detection: A Survey", Computer Vision and Image Understanding 83, 236-274 (2001), pp. 236-275.
Harold M. Merklinger, "A Technical View of Bokeh", Photo Techniques, May/Jun. 1997, 5 pages.
Gary Bradski et al, "Learning-Based Computer Vision with Intel's Open Source Computer Vision Library,"Intel Technology Journal, vol. 9, Issue 02, May 19, 2005, pp. 119-130.
PCT International Search Report and Written Opinion for PCT/US2008/058338. Dated Jun. 30, 2008.

* cited by examiner

*Primary Examiner* — James M Hannett
(74) *Attorney, Agent, or Firm* — Stewart M. Wiener (57) ABSTRACT

An arrangement for simulating a short depth of field in a captured videophone image is provided in which the background portion of the image is digitally segregated and blurred to render it indistinct. Thus, the displayed video of a user in the foreground is kept in focus while the background appears to be out of focus. Image tracking or fixed templates are used to segregate an area of interest that is kept in focus from the remaining captured video image. Image processing techniques are applied to groups of pixels in the remaining portion to blur that portion of the captured video image. Such techniques include the application of a filter that are alternatively selected from convolution filters in the spatial domain (e.g., mean, median, or Gaussian filters), or frequency filters in the frequency domain (e.g., low-pass or Gaussian filters). User-selectable control is optionally implemented for controlling the type of foreground/background segregation technique utilized (i.e., dynamic face-tracking or fixed template shape), degree of blurring applied to the background, and on/off control of the background blurring.

20 Claims, 9 Drawing Sheets

SIMULATING SHORT DEPTH OF FIELD TO MAXIMIZE PRIVACY IN VIDEOTELEPHONY

BACKGROUND

Current videophones use cameras having a long depth of field which results in the subject matter in a scene captured by the camera from foreground to background being in focus. This compares to video images captured by cameras having a shorter depth of field where subject matter in the foreground appears in focus while subject matter in the background of the scene appears out of focus.

Long depth of field in videophones generally results from a small digital imaging sensor size relative to the lens aperture in combination with a fixed focal length and shutter speed. These particular design parameters are selected in order to provide good videophone image quality while maintaining low component costs which is important for videophones sold into the highly competitive consumer electronics market.

Consumer-market videophones provide excellent performance overall, and the long depth of field provided is normally acceptable in many settings. Not only does it provide a perception that the videophone image is sharp and clear overall, but a videophone can be used in a variety of settings without the user worrying that some portions of a captured scene be out of focus. For example, a group of people on one end of a videophone call can have some participants positioned close to the camera while others are farther away. Another user may wish to use the videophone to show something that needs to be kept at some distance from the camera.

However, the videophone's long depth of field can present issues in some situations. Some users may find the details in the background of the received video image to be distracting. Others might be uncomfortable that their videophone captures too a clear view of themselves, their home, or surroundings and represents some degree of intrusion on their privacy. And even for those users who fully embrace the videophone's capabilities, it is possible that details of a user's life may be unintendedly revealed during a videophone call. For example, a person might not realize that a videophone call is taking place and walk through the background in a state of attire that is inappropriate for viewing by people outside the home.

One current solution to address privacy concerns includes placing controls on the videophone that let a user turn the videophone camera off while keeping the audio portion of the call intact. While effective in many situations, it represents an all or none solution that not all users accept since the loss of the video function removes a primary feature provided by the videophone. In addition, such user controls do not prevent the accidental capture of undesirable or inappropriate content by the videophone.

SUMMARY

An arrangement for simulating a short depth of field in a captured videophone image is provided in which the background portion of the image is digitally segregated and blurred to render it indistinct. As a result, the displayed video image of a videophone user in the foreground is kept in focus while the background appears to be out of focus.

In various illustrative examples, image detection and tracking techniques are used to dynamically segregate a portion of interest—such as a person's face, or face and shoulder area that is kept in focus—from the remaining video image. Image processing techniques are applied to groups of pixels in the remaining portion to blur that portion and render it indistinct. Such techniques include the application of one or more filters selected from convolution filters in the spatial domain (e.g., mean, median, or Gaussian filters), or frequency filters in the frequency domain (e.g., low-pass or Gaussian filters). Fixed templates are also alternatively utilizable to segregate the portions of the captured video which are respectively focused and blurred. The templates have various shapes including those that are substantially rectangular, oval, or arch-shaped. For example, application of the oval-shaped template keeps the portion of the captured video image falling inside a fixed oval in focus and the remaining portion of the image falling outside the oval is then digitally blurred.

User-selectable control is optionally provided to enable control of the type of foreground/background segregation technique utilized (i.e., dynamic object detection/tracking or fixed template shape), degree of blurring applied to the background, and on/off control of the background blurring.

The simulated short depth of field provided by present arrangement advantageously enables a high degree of privacy to be implemented while preserving the intrinsic value of videophone telephony by keeping the video component of the videophone call intact. The privacy feature is provided using economically-implemented digital image processing techniques that do not require modifications or additions to the camera hardware which would add undesirable costs. In addition, the blurred background portion of the video image appears natural to the viewer because short depth of field images are in common use in television, movies, and other media presentations. Thus, privacy is enabled in a non-intrusive manner that does not interfere with the videophone call or bring attention to the fact that privacy is being utilized.

DESCRIPTION OF THE DRAWINGS

Like reference numerals indicate like elements throughout the drawings.

DETAILED DESCRIPTION

Various compositional techniques are employed in traditional photography to emphasize the primary subject matter in a scene. One such technique is known as "Bokeh" which is Japanese term that translates into "fuzzy" or "dizziness." Bokeh refers to the use of out-of-focus highlights or areas in a rendered image. Bokeh techniques may be used for a variety of functional, artistic, or aesthetic reasons in which an attribute known as "depth of field" is manipulated to provide the desire effect where the primary subject is kept in focus while the remaining portion of the rendered image is out of focus.

Depth of field in both still and video photography is determined by lens aperture, film negative/image sensor size (in traditional/digital imaging, respectively), and focal length. Traditional 35 mm film has a short depth of field because the negative size is large compared with the lens aperture. By comparison, to minimize costs, most videophones targeted at the consumer market use a very small digital image sensor along with an optics package that includes a fixed focal length and shutter speed. Thus, traditional techniques used to shorten depth of field by adjusting the aperture number (i.e., f/stop) down below the lens's maximum aperture and reducing shutter speed to compensate for exposure are not generally applicable to videophone cameras.

Depth of field is the range of distance around the focal plane which is acceptably sharp. The depth of field varies depending on camera type, aperture and focusing distance, although the rendered image size and viewing distance can influence the perception of it. The depth of field does not abruptly change from sharp to unsharp, but instead occurs as a gradual transition. In fact, everything immediately in front of or in back of the focusing distance begins to lose sharpness even if this is not perceived by the viewer or by the resolution of the camera.

Because there is no critical point of transition, a term called the "circle of confusion" is used to define how much a particular point needs to be blurred in order to be perceived as being unsharp. The circle of confusion is an optical spot caused by a cone of light from a lens not coming to a perfect focus when imaging a point source. Objects with a small "circle of confusion" show a clear and clean dot and are in focus. Objects with a large "circle of confusion" show a dot with blurry edges and are out of focus.

Accordingly, the present arrangement provides a person's face or other area of interest in the foreground of the rendered videophone image with a small circle of confusion. The remaining portion of the image is rendered with a large circle of confusion. Further discussion of Bokeh techniques, circle of confusion and sample images are available in H. Merklinger, A Technical View of Bokeh, *Photo Techniques*, May/June (1997).

Figure 1:
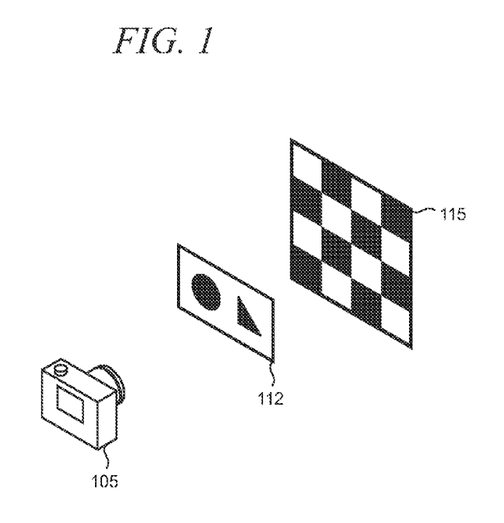
FIG. 1 shows a camera and two black and white patterned targets located in the camera's field of view.
Figure 2:
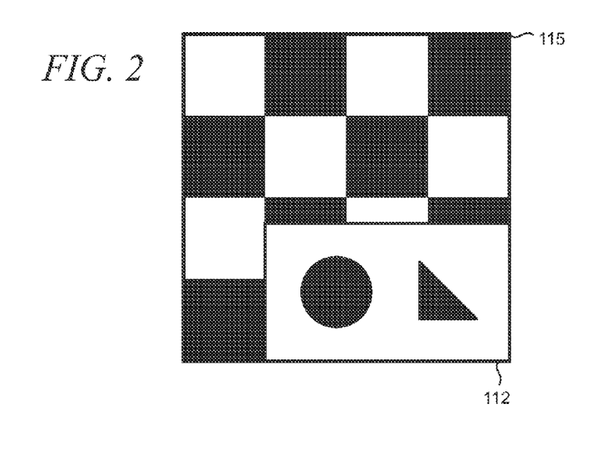
FIGS. 2 and 3 show images captured by the camera to illustrative depth of view.
Figure 3:
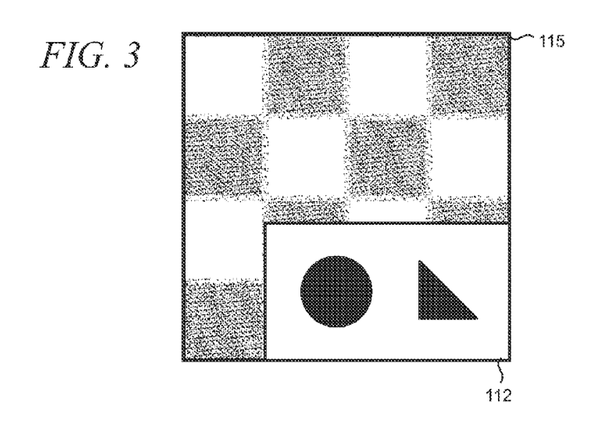

FIGS. 1-3 are provided to illustrate the application of the principles of depth of field to the present arrangement. FIG. 1 is a pictorial illustration showing a camera 105 having two black and white patterned targets 112 and 115 within its field of view. As shown, target 112 is in the foreground of the camera's field of view and target 115 is in the background.

FIG. 2 shows an example of the appearance of an image with a long depth of focus taken by camera 105. As shown, targets 112 and 115 are both in focus. By comparison, FIG. 3 shows an example of an image having a shorter depth of focus. Here, the target 112 in the foreground is in focus, but target 115 in the background is no longer in focus and appears blurry.

Figure 4:
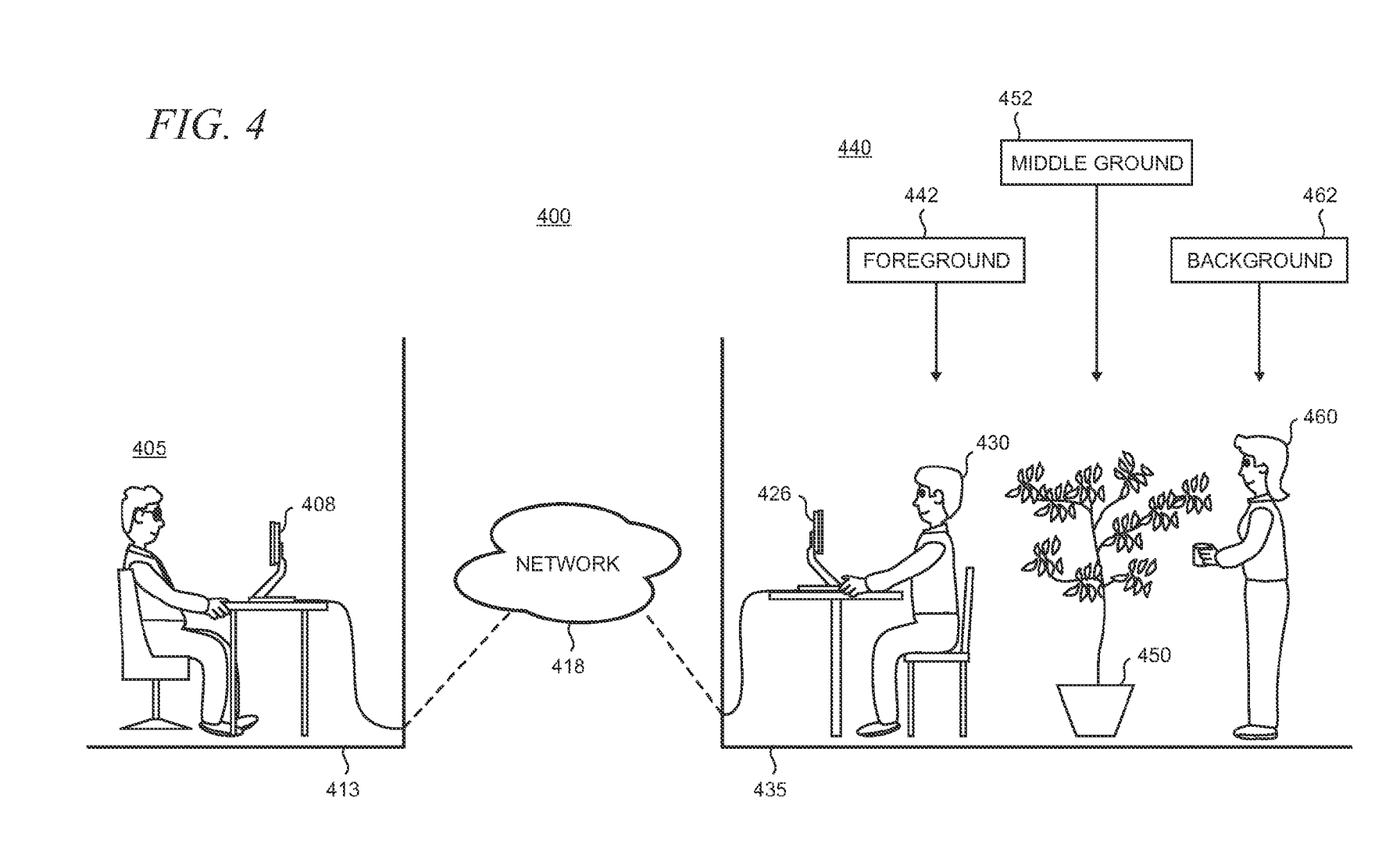
FIG. 4 is a pictorial view of an illustrative arrangement showing two videophone users.

Turning to FIG. 4, there is shown an illustrative arrangement 400 in which two videophone users are engaged in a video telephony session. User 405 is using videophone 408 in home 413. Videophone 408 is coupled over a network 418 to videophone 426 used by user 430 in home 435. Videophones generally provide better image quality with both higher frame rates and resolution when calls are carried over broadband networks, although some videophones are configured to work over regular public switched telephone networks ("PSTNs"). Broadband networks services are commonly provided from cable, DSL (Digital Subscriber Line) and satellite service providers. Videophones are normally used in pairs where each party on the call uses a videophone.

Figure 5:
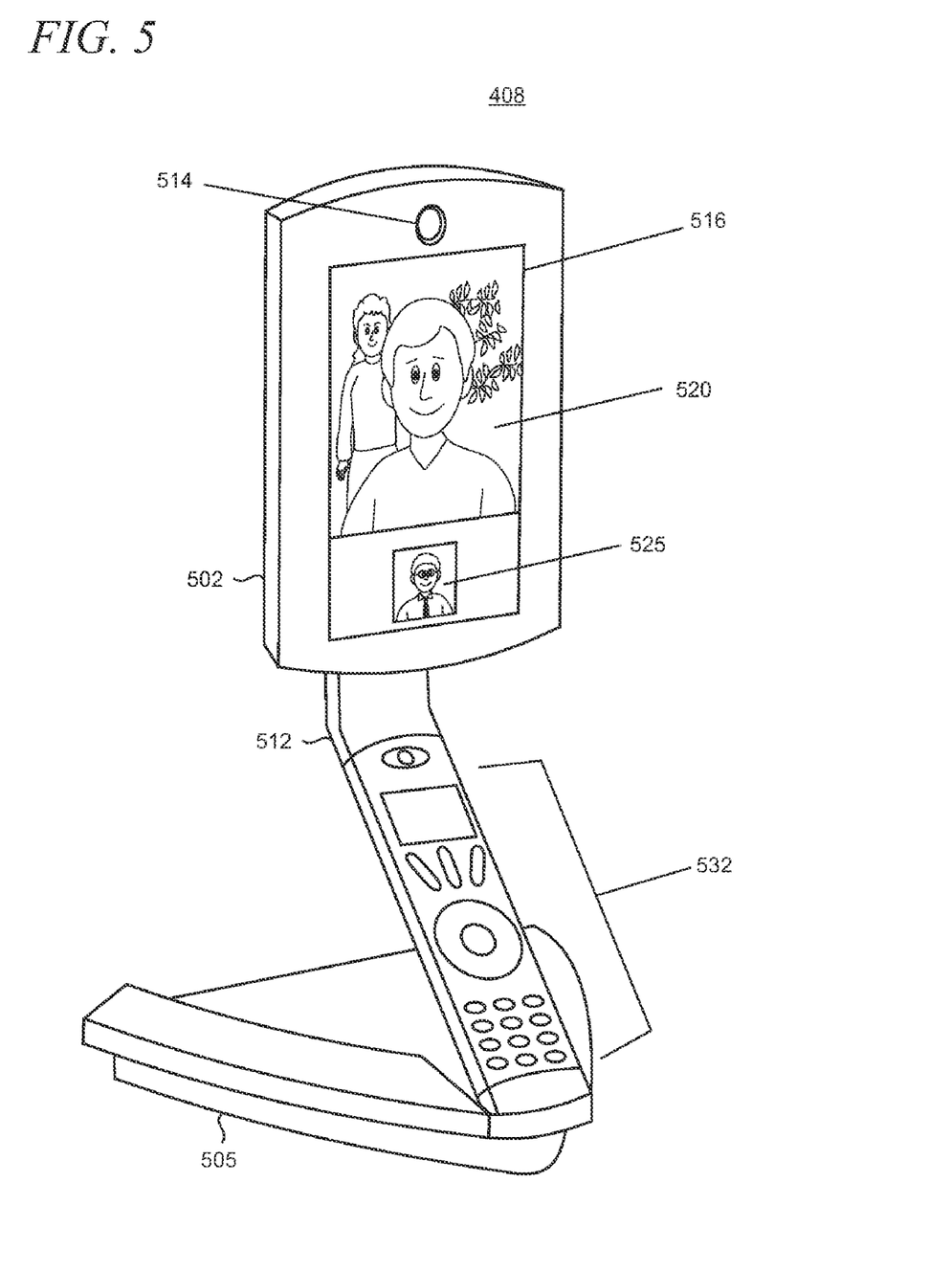
FIG. 5 is a pictorial view of one of the videophones shown in FIG. 4.

FIG. 5 is a pictorial view of the videophone 408 shown in FIG. 4. Videophone 408 is representative of videophones that are available to the consumer market. Videophone 408 includes a display component 502 that is attached to a base 505 with a mounting arm 512. Base 505 is configured to allow videophone 408 to be positioned on desk or table, for example. A camera 514 is disposed in the display component having a lens that is oriented towards the videophone user, as shown. A microphone (not shown) is also positioned near camera 514 to capture voices and other sounds associated with a videophone call.

Camera 514 is commonly implemented using a CCD (charge coupled device) image sensor that captures images formed, from a multiplicity of pixels (i.e., discrete picture elements), of the videophone user and surrounding area. The images from camera 514 are subjected to digital signal processing in videophone 408 to generate a digital video image output stream that is transmitted to the videophone 426 on the other end of the videophone call. In this illustrative example, the digital video image output stream is a compressed video stream compliant with MPEG-4 video standard defined by the Moving Picture Experts Group with the International Organization for Standardization ("ISO"). In alternative embodiments, other formats and/or video compression schemes are usable including one selected from MPEG-1, MPEG-2, MPEG-7, MPEG-21, VC-1 (also known as Society of Motion Picture and Television Engineers SMPTE 421M), DV (Digital Video), DivX created by DivX, Inc. (formerly known as DivXNetworks Inc.), International Telecommunications Union ITU H.261, ITU H.263, ITU H.264, WMV (Windows Media Video), RealMedia, RealVideo, Apple QuickTime, ASF (Advanced Streaming Format, also known as Advanced System Format), AVI (Audio Video Interface), 3GPP ($3^{rd}$ Generation Partnership Project), 3GPP2 ($3^{rd}$ Generation Partnership Project 2), JPEG (Joint Photographic Experts Group), or Motion-JPEG.

Display component 502 includes a screen 516 that comprises a receiving picture area 520 and a sending picture area 525. The receiving picture area 520 of screen 516 is arranged to display the video image of the user 430 captured by a camera in videophone 426 shown in FIG. 4. The sending picture area 525 displays a relatively smaller image of the user 405 captured by the camera 514. Sending picture area 525 thus enables user 405 to see the picture of himself that is being sent and seen by the other user 430. Such feedback is important to enable user 405 to place himself in field of view of camera 514 with the desired positioning and framing within the captured video image.

Mounting arm 512 is arranged to position the display component 502 and camera 514 at a distance above the base 505 to provide comfortable viewing of the displayed video image and position the camera 514 with a good field of view of the videophone user. Disposed in mounting arm 512 are videophone operating controls 532 which are provided for the user to place videophone calls, set user-preferences, adjust videophone settings, and the like.

Referring again to FIG. 4, videophone user 430 is positioned in the foreground of a scene 440 captured by the camera disposed in videophone 426. The foreground is indicated by reference numeral 442. Similarly, as shown, a houseplant 450 is in the middle ground 452 of the scene, and a family member 460 is in the background 462.

Figure 6:
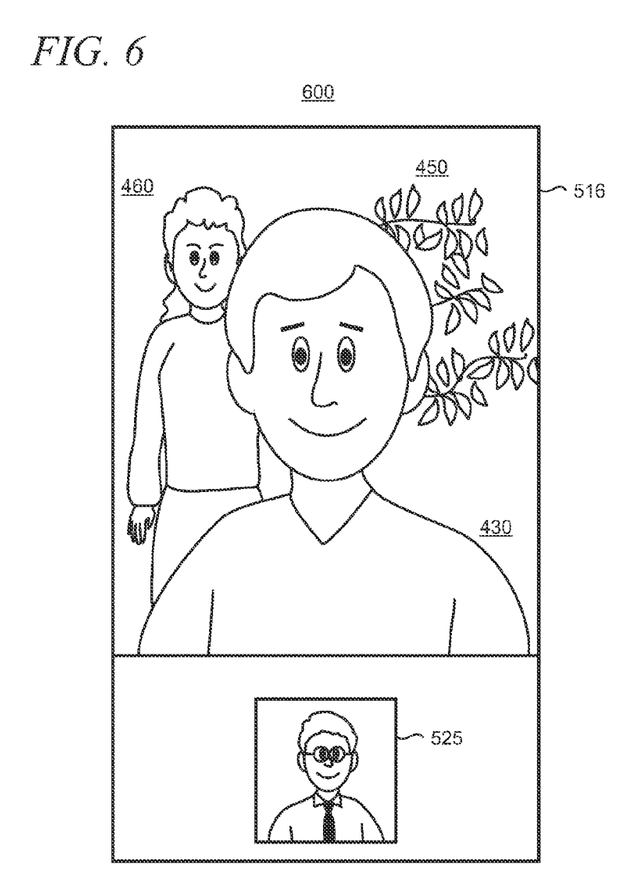
FIG. 6 shows an illustrative screen shot of a video image having a long depth of field that is rendered by a videophone.

FIG. 6 shows an illustrative screen shot 600 of a video image of the captured scene 440 in FIG. 4 as rendered onto screen 516 by the videophone 408. As shown, the rendered image appears with a long depth of field as user 430, houseplant 450, and family member 460 are all in focus. As noted above, such long depth of field is normally provided for video images rendered by conventional videophones. And, such clear imaging of all the subject matter in the capture scene may present privacy concerns.

Figure 7:
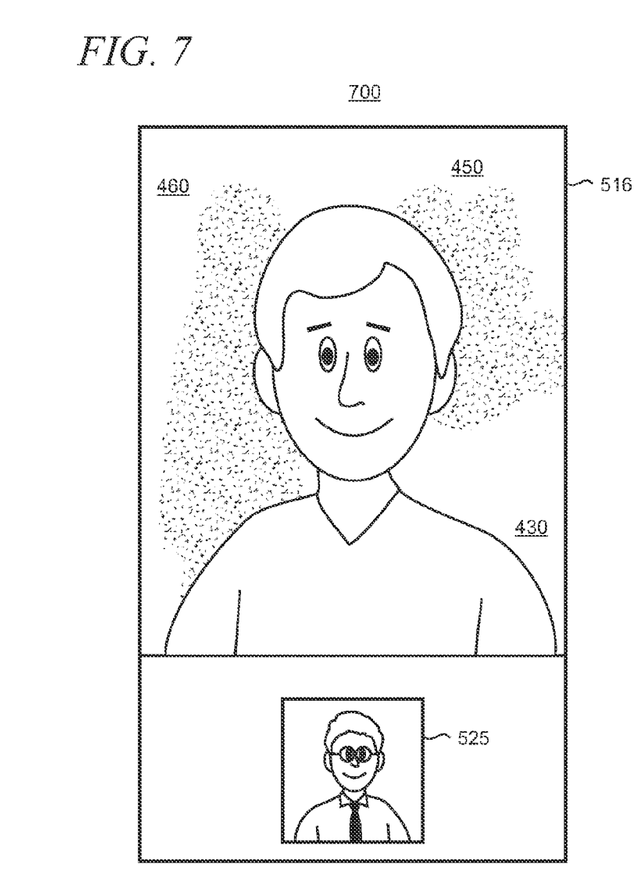
FIG. 7 shows an illustrative screen shot of a video image with a simulated short depth of field that is rendered by a videophone in accordance with the principles of the present arrangement.

In comparison to the conventional long depth of field video image shown in FIG. 6, FIG. 7 shows an illustrative screen shot 700 of a video image of having a simulated short depth of field as provided by the present arrangement. The video image shown in screen shot 700 is of the same captured scene 440 as rendered onto screen 516 by the videophone 408. Here, only the image of the user 430 in the foreground 442 is kept in focus while the houseplant 450 and family member 460 are blurred and rendered indistinct as indicated by the dot patterns in FIG. 7.

Figure 8:
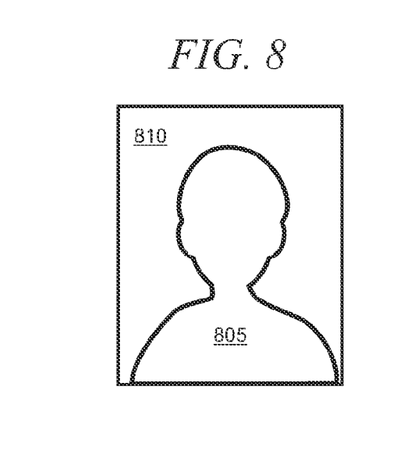
FIG. 8 is an illustration showing an illustrative segregation of a captured video image into a portion of interest that is kept in focus and a remaining portion that is blurred using a variety of alternative image processing techniques.

FIG. 8 is an illustration showing an illustrative segregation of a captured video image into a region of interest 805 that is kept in focus and a remaining portion 810 that is blurred using a one of several alternative image processing techniques (as described below in the text accompanying FIGS. 13 and 14). In this illustrative example, object detection techniques are utilized in which a specific feature, in this case the user's face, head, and shoulders are dynamically detected in the captured video image and tracked as the user moves and/or changes position during the course of the videophone call. While FIG. 8 shows the area of interest comprises the user's face, head, and shoulder region, other areas of interest may also be defined for detection and tracking. For example, the area of the image kept in focus using a dynamic detection and tracking technique may be limited to just the user's face area.

Object detection, and in particular, face detection is an important element of various computer vision areas, such as image retrieval, shot detection, video surveillance, etc. The goal is to find an object of a pre-defined class in a video image. A variety of conventional object detection in video images techniques are usable depending on the requirements of a specific application. Such techniques include feature-based approaches which locate face geometry features by extracting, for example certain image features, such as edges, color regions, textures, contours, video motion cues etc., and then using some heuristics to find configurations and/or combinations of those features specific to the object of interest.

Other object detection techniques use image-based approaches in which the location of objects such as faces is essentially treated as a pattern recognition problem. The basic approach in recognizing face patterns is via a training procedure which classifies examples into face and non-face prototype classes. Comparison between these classes and a 2D intensity array (hence the name image-based) extracted from an input image allows the decision of face existence to be made. Image-based approaches include linear subspace methods, neural networks, and statistical approaches.

An overview of these techniques and a discussion of others may be found in E. Hjelmas and B. K. Low, Face Detection: A Survey, *Computer Vision and Image Understanding* 83, 236-274 (2001). In addition, a variety of open source code sources are available to implement appropriate face-detection algorithms including the OpenCV computer vision facility from Intel Corporation provides both low-level and high-level APIs (application programming interfaces) for face detection using a statistical model. This statistical model, or classifier, takes multiple instances of the object class of interest, or "positive" samples, and multiple "negative" samples, i.e., images that do not contain objects of interest. Positive and negative samples together make a training set. During training, different features are extracted from the training samples and distinctive features that can be used to classify the object are selected. This information is "compressed" into the statistical model parameters. If the trained classifier does not detect an object (misses the object) or mistakenly detects the absent object (i.e., gives a false alarm), it is easy to make an adjustment by adding the corresponding positive or negative samples to the training set. More information on Intel OpenCV face detection may be found in G. Bradski, A. Kaehler, and V. Pisarevsky, Learning-Based Computer Vision with Intel's Open Source Computer Vision Library, *Intel Technical Journal*, Vol. 9, Issue 2, (2005).

Figure 9:
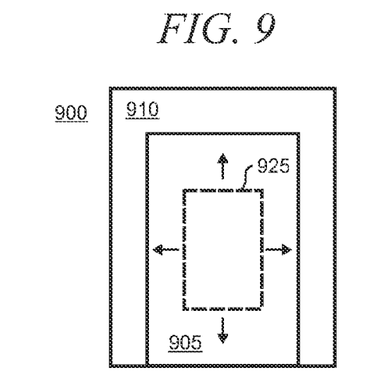
FIGS. 9-11 show various illustrative fixed templates, each of which segregate a portion of interest in a video image that is kept in focus while the remaining portions are blurred.
Figure 10:
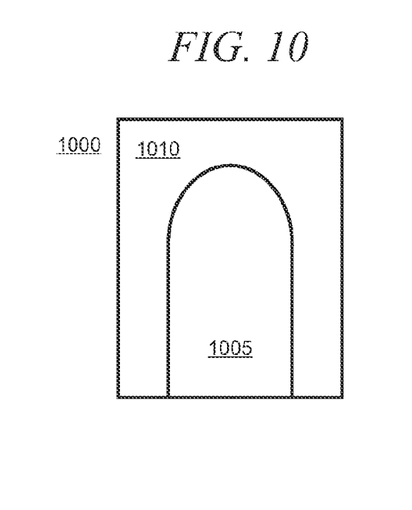
Figure 11:
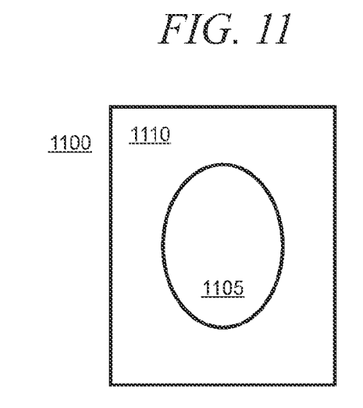

FIGS. 9-11 show illustrative examples of fixed templates that are applied to a captured video image to segregate the portion of interest from the remaining portion. By comparison to the object detection technique where the shape of the target portion dynamically varies as the subject moves, the templates in FIGS. 9-11 use a fixed border between the target and remaining portions. Use of fixed templates may provide a less complex implementation of the segregation aspect of the present arrangement for implementing privacy while maintaining the majority of its functionality which may be beneficial in some scenarios. In an optional arrangement, control is provided to the videophone user to select from various templates to find a template that best matches the particular use and circumstances. In other arrangements, the relative sizes of the target and remaining portions may be adjusted, either in fixed increments or infinitely in a fixed range.

As shown, template 900 in FIG. 9 has a substantially rectangular target portion 905 that is disposed in an area that fills approximately the central two-thirds of the screen. Target portion 905 is positioned to allow the remaining portion 910 to fill the top and sides of the screen. This template makes use of the observation that most videophone users position themselves to fill the central portion of the videophone camera's field of view. Accordingly, the areas of potential privacy concern will tend to be at the tops and sides of the captured image. As noted above, in optional arrangements the relative size between the target portion 905 and remaining portion 910 may be configured to be user adjustable as indicated by the dashed rectangle 925 in FIG. 9.

FIG. 10 shows a template 1000 that is similar to that shown in FIG. 9 (by occupying approximately the central two-thirds of the screen) except the top portion of the target portion 1005 is curved. Thus, the target portion 1005 is substantially arched shaped. Use of this shape increases the area of the remaining portion 1010 and may provide a better fit between in-focus and blurred portions for a particular user's application.

FIG. 11 shows a template 1100 in which the target portion is substantially oval shaped. In this case, the remaining portion 1110 surrounds the target portion 1105 so that privacy blurring will be performed at the bottom center of the rendered image (unlike templates 900 and 1000) along with the top and side areas of the screen.

Figure 12:
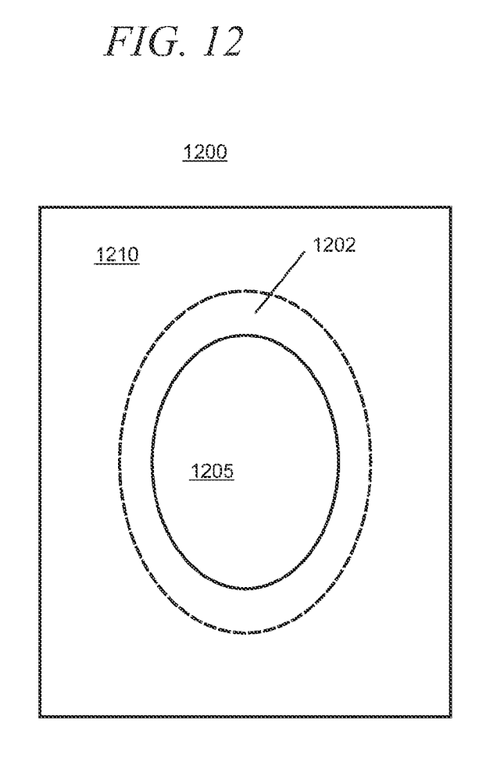
FIG. 12 is a diagram of an illustrative template having a transition area between the portion of interest that is kept in focus and the blurred portion.

FIG. 12 shows an illustrative template 1200 having a transition area 1202 between the target portion 1205 in which focus is kept intact and remaining portion 1210 that is blurred using the present techniques described herein. The transition area 1202 is configured with an intermediate degree of circle of confusion between the target portion 1205 and remaining portion 1210. This enables a softer transition between focus and blurred areas to be achieved which may help to make the rendered image appear more natural in some situations. The size of the transition area 1202 is a design choice that will normally be selected according to the requirements of a particular application. Although the transition area is shown being used with a template having an oval target portion, it is emphasized that such transition area may be used with any target portion shape in both fixed templates and dynamic object detection embodiments.

Once a captured video image is segregated into a portion of interest and a remaining portion, digital image processing is performed to increase the circle of confusion for groups of pixels in the remaining portion to thereby blur it and render it indistinct. In this illustrative example, the digital image processing comprises filtering in either the spatial domain or frequency domain.

The spatial domain is normal image space in which an image is represented by intensities at given points in space. The spatial domain is a common representation for image data. A convolution operator is applied to blur the pixels in the remaining portion. Convolution is a simple mathematical operation which is fundamental to many common image processing operations. Convolution provides a way of multiplying together two arrays of numbers, generally of different sizes, but of the same dimensionality, to produce a third array of numbers of the same dimensionality. This can be used in image processing to implement operators whose output pixel values are simple linear combinations of certain input pixel values.

In an image processing context, one of the input arrays is typically a set of intensity values (i.e., gray level) for one of the color components in the video image, for example using the RGB (red green blue) color model. The second array is usually much smaller, and is also two-dimensional (although it may be just a single pixel thick), and is known as the kernel. FIG. 13 shows an example image 1305 and kernel 1310 used to illustrate convolution.

The convolution is performed by sliding the kernel over the image, generally starting at the top left corner, so as to move the kernel through all the positions where the kernel fits entirely within the boundaries of the image. (Note that implementations differ in what they do at the edges of images, as explained below.) Each kernel position corresponds to a single output pixel, the value of which is calculated by multiplying together the kernel value and the underlying image pixel value for each of the cells in the kernel, and then adding all these numbers together to produce the output, O. Thus, in the example shown in FIG. 13, the value of the bottom right pixel in the output image will be given by:

$$O_{57} = I_{57}K_{11} + I_{58}K_{12} + I_{59}K_{13} + I_{67}K_{21} + I_{68}K_{22} + I_{69}K_{23}$$

If the image I has M rows and N columns, and the kernel has m rows and n columns, then the size of the output image will have M−m+1 rows, and N−n+1 columns. Mathematically, the convolution is written as:

$$O(i, j) = \sum_{k=1}^{m} \sum_{l=1}^{n} I(i+k-1, j+l-1) K(k, l)$$

where i runs from 1 to M−m+1 and j runs from 1 to N−n+1.

In one illustrative example, the convolution filter applied is called a mean filter where each pixel in the image is replaced by an average value of its neighbors, including itself. Mean filters are also commonly referred to as "box," "smoothing," or "averaging" filters. The kernel used for the mean filter represents the size and shape of the neighborhood to be sampled when calculating the mean. Often, a 3×3 square kernel as indicated by reference numeral 1410 in FIG. 14, although larger 5×5, 7×7 etc., kernels may also be used to create more blurring. The kernel 1405 may also be applied more than once.

A median filter is alternatively utilized in which the average value used in the mean filter is replaced by the median value of neighboring pixels.

In another illustrative example, a Gaussian filter is applied to blur the remaining portions other than the portion of interest in the image to be rendered in focus. This filter uses a kernel having a shape that represents a Gaussian (i.e., bell-shaped curve) as represented by:

$$G(x) = \frac{1}{\sqrt{2\pi}\sigma} e^{-\frac{x^2}{2\sigma^2}}$$

where σ is the standard deviation of the distribution (which is assumed to have a mean of zero, i.e., centered on the line x=0).

The effect of Gaussian smoothing is to blur an image, in a similar fashion to the mean filter described above. The degree of smoothing is determined by the standard deviation of the Gaussian. Larger standard deviation Gaussians require larger convolution kernels in order to be accurately represented.

The Gaussian outputs a "weighted average" of each pixel's neighborhood, with the average weighted more towards the value of the central pixels. This is in contrast to the mean filter's uniformly weighted average. Because of this, a Gaussian filter generally provides gentler smoothing and preserves edges better than a similarly sized mean filter.

The frequency domain is the domain in which a video image is represented by a sum of periodic signals with varying frequency. The applied filter function is shaped so as to attenuate some frequencies and enhance others. Generally, since the multiplication in the Fourier space is identical to convolution in the spatial domain, all frequency filters can also be implemented in the spatial domain. In addition, if there exists a simple kernel for the desired filter effect, it is computationally less expensive to perform the filtering in the spatial domain. Frequency filtering is more appropriate if no straightforward kernel can be found in the spatial domain, and may also be more efficient.

To apply a filter in the frequency domain, groups of pixels in the remaining portion other than the area of interest in the image are Fourier transformed from the spatial domain to the frequency domain:

$$G(k,l) = F(k,l) H(k,l)$$

where F(k,l) is the input image in the Fourier domain, H(k,l) the filter function and G(k,l) is the filtered image. To obtain the resulting image in the spatial domain, G(k,l) has to be re-transformed using the inverse Fourier Transform.

The form of the filter function determines the effects of the operator. In the present arrangement, a low-pass filter is used to attenuate high frequencies and retain low frequencies unchanged. The result in the spatial domain is equivalent to that obtained by application of the mean filter in the spatial domain: as the blocked high frequencies correspond to sharp intensity changes, i.e., to the fine-scale details in the spatial domain image.

The most simple lowpass filter is the ideal lowpass. It suppresses all frequencies higher than the cutoff frequency $D_0$ and leaves the smaller frequencies unchanged.

$$H(k, l) = \begin{cases} 1 \text{ if } \sqrt{k^2 + l^2} < D_0 \\ 0 \text{ if } \sqrt{k^2 + l^2} > D_0 \end{cases}$$

In most applications, $D_0$ is given as a fraction of the highest frequency represented by the Fourier domain image.

In applications of the present arrangement, the application of a Gaussian filter in the frequency domain will produce more desirable results than the ideal lowpass filter. A commonly used discrete approximation to the Gaussian is known as the Butterworth filter. Applying this filter in the frequency domain shows a similar result to the Gaussian smoothing in the spatial domain.

Figure 15:
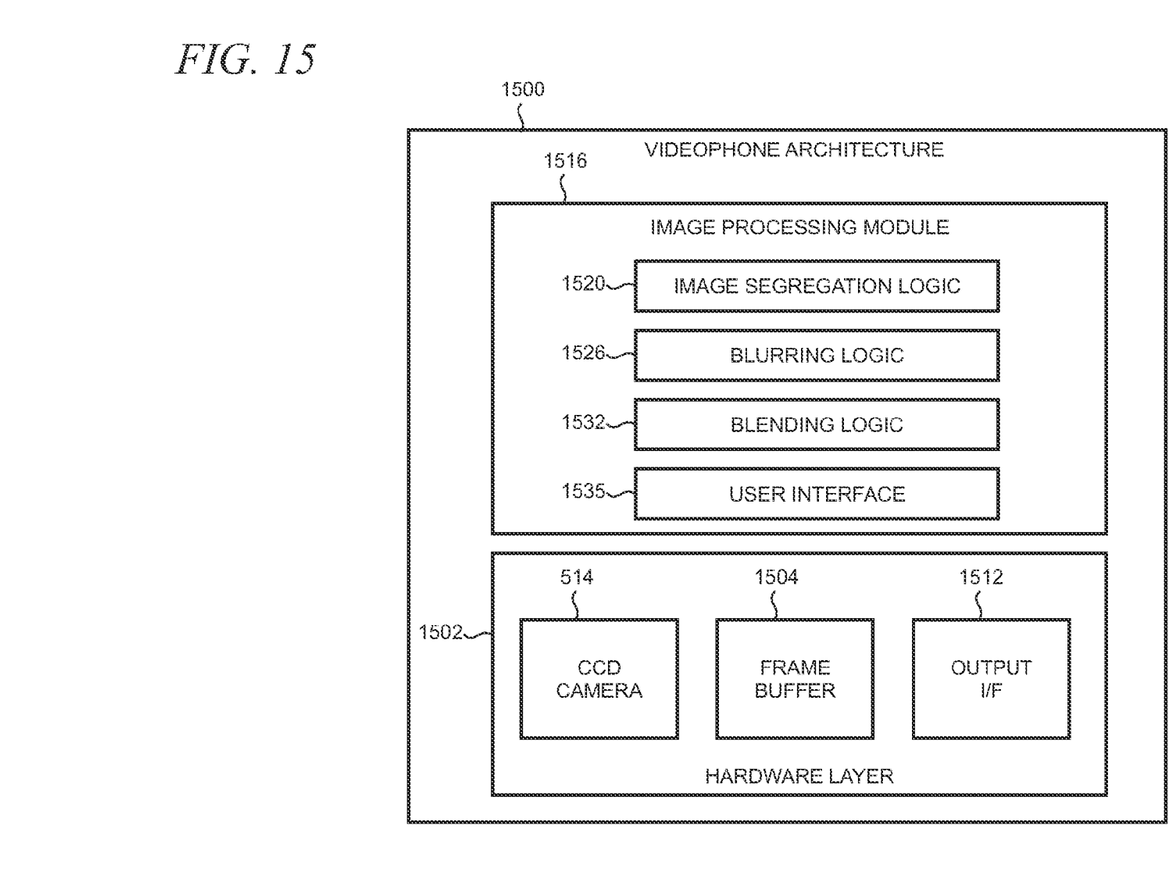
FIG. 15 is simplified diagram of an illustrative videophone architecture.

FIG. 15 is an illustrative architecture 1500 for the videophones 408 and/or 426 (FIG. 4). The CCD imaging sensor forming camera 514, which captures a video image having a long depth of field (i.e., one that is substantially infinite), is included in an abstracted hardware layer 1502 in architecture 1500. Hardware layer 1502 also includes a frame buffer 1504 and output interface 1512. The captured video image is processed by an image processing module 1516 having a number of components including image segregation logic 1520, blurring logic 1526, blending logic 1532, and a user interface 1535. Image processing module 1516 and the components therein may be discretely embodied in some applications, using for example hardware such as one or more application-specific integrated circuits and/or firmware. Alternatively, image processing module 1516 may be constructed as a logical device that is implemented using software resident on the videophone 408, or a combination of hardware, firmware, or software.

Segregation logic 1520 is arranged to segregate the video image from the camera 514 into a target portion (for which focus is maintained) and remaining portion (for which blurring is imposed to thereby render that portion indistinct). The segregation is performed using object detection described in the text accompanying FIG. 8, or alternatively using one of the templates described in the text accompanying FIGS. 9-12.

Blurring logic 1526 is arranged to blur the remaining portion of the captured video image to increase the circle of confusion of pixels therein to thereby render the subject matter indistinct. Such blurring is accomplished using one or more of the digital filtering techniques described in the text accompanying FIGS. 13 and 14. Blurring logic is optionally configured to adjust the degree of blurring responsively to input from a user. Blurring logic 1526 is alternatively arranged to replace the remaining portion of the captured video image with a predefined image (e.g., wallpaper) as described above.

Blending logic 1532 is arranged to generate a composite video image in which the target portion that is unblurred is combined with the blurred remaining portion. In some applications, blending logic 1532 and blurring logic 1526 are configured to enable multiple blurring levels as shown in FIG. 12 and described in the accompanying text.

The user interface 1535 is arranged to provide a user of the videophone 408 with user-selectable control over the present privacy features. For example, the user may selectively enable and/or disable the privacy feature so that the background portion of the captured image is rendered indistinct or kept in focus. The degree to which blurring is implemented, whether object detection/tracking or fixed templates are utilized, and template shape may also be user-selectable in some applications of the present arrangement.

Figure 16:
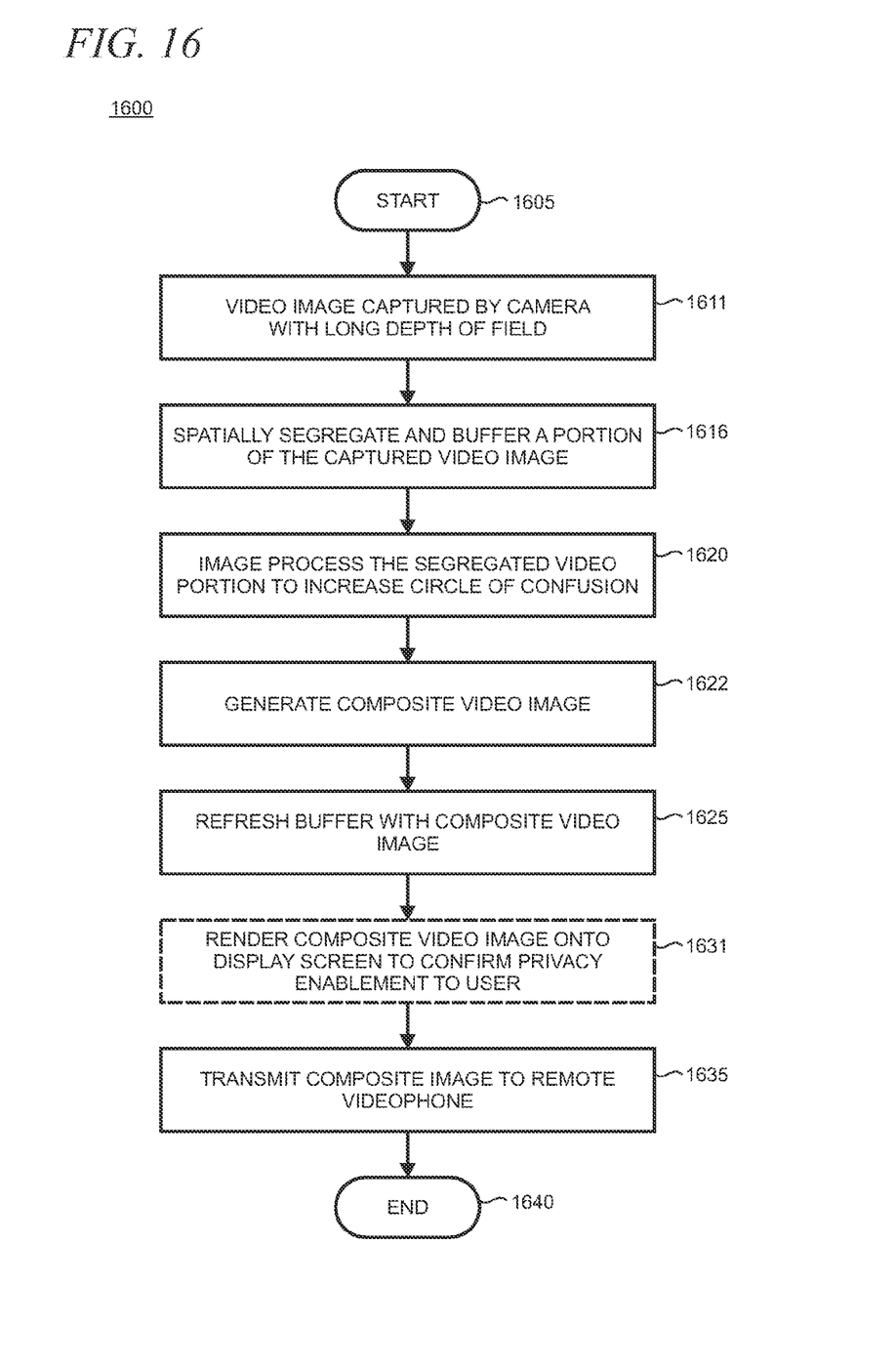
FIG. 16 is a flowchart of an illustrative method simulating depth of field effects in a video image.

The frame buffer 1504 is utilized in the videophone architecture 1500 to temporarily store video images during processing. The output interface 1512 reads video images from the frame buffer 1504 for real time transmission as a video output stream over the network 418 (FIG. 4). In most applications, the output stream is formatted in accordance with MPEG-4. Alternatively, MPEG-2, FIG. 16 is a flowchart of an illustrative method 1600 for simulating depth of field effects in a video image. Method 1600 may be utilized by either videophone 408 or 426 in FIG. 4. The method starts at block 1605. At block 1611, a camera (e.g., camera 514) captures a video image having long or substantially infinite depth of field that is typical for most videophones sold into the consumer market.

At block 1616, the captured video image is spatially segregated into a target portion for which focus is maintained and a remaining portion for which blurring is applied using one of the techniques described in the text accompanying FIG. 8. Typically, the video image is buffered (e.g., in frame buffer 1504 in FIG. 15) during the image processing steps of segregating, blurring, and compositing.

Figure 13:
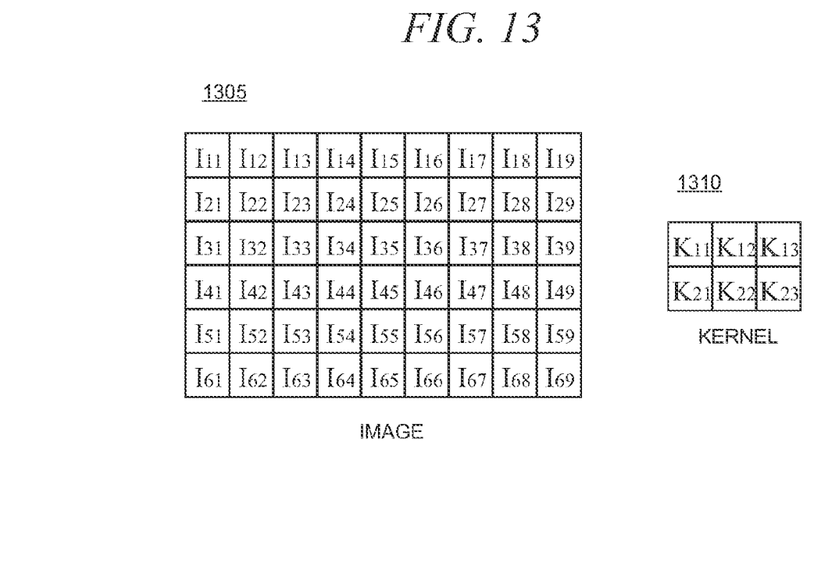
FIG. 13 shows an illustrative image and kernel arrays used to perform convolution attendant to application of digital filtering.
Figure 14:
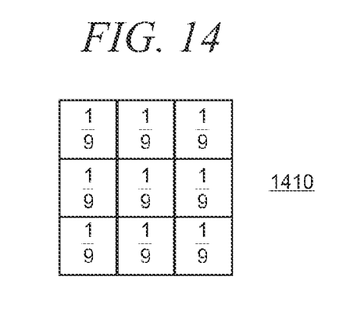
FIG. 14 is an illustrative kernel used with a mean (i.e., averaging) digital filter.

At block 1620, the remaining portion of the captured video image is blurred to increase the circle of confusion of pixels therein to thereby render the subject matter indistinct using one or more of the digital filtering techniques described in the text accompanying FIGS. 13 and 14. The blurred remaining portion is combined with the unblurred target portion to create a composite video image as indicated in block 1622 which is then refreshed in the frame buffer at block 1625.

Figure 17:
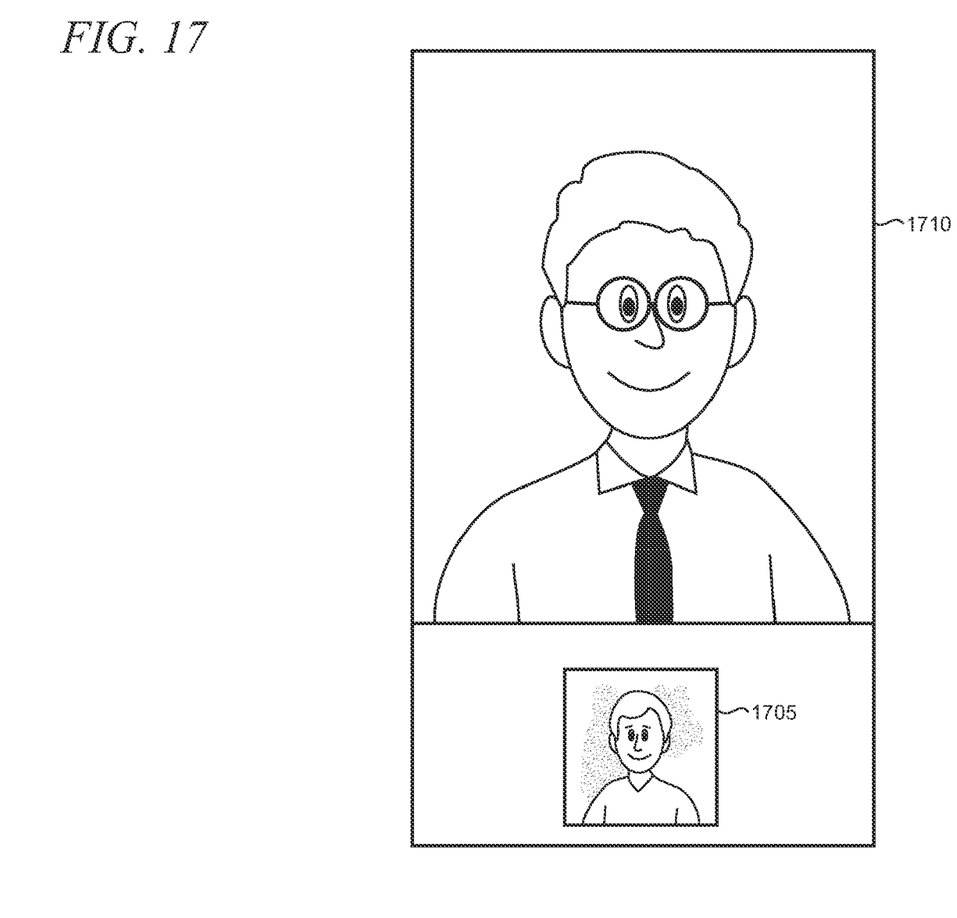
FIG. 17 shows an illustrative screen shot of a video image with a simulated short depth of field that is rendered by a videophone to provide positive feedback to a user that privacy is enabled in accordance with the principles of the present arrangement.

Block 1631 shows an optional step (as indicated by the dashed rectangle in FIG. 16) in which the composite video image is displayed locally on the videophone's display screen. This optional step is shown in the screen shot of FIG. 17 and is performed to enable the videophone user (i.e., videophone user 430 using videophone 426 in FIG. 4) to receive positive feedback that the privacy feature is enabled. That is, the user can see him or herself in the small image 1705 at the bottom of display screen 1710. Image 1705 includes the rendered composite image. In applications where privacy is arranged to be user-selectively enabled and disabled, image 1705 would include a normal video image (i.e., not processed to implement privacy) that would include the typical long depth of field when the privacy feature is disabled.

Returning again to FIG. 16, block 1635 shows that the composite video image is transmitted to the videophone at the far end of the call. Typically, the composite video image is sent as part of a video stream that is compliant with MPEG-4. Illustrative method 1600 ends at block 1640.

Although a discrete and dedicated videophone arrangement has been provided in the description above, it is noted that the feature and functions described are alternatively implementable using general purpose personal computers ("PCs"). In this scenario, webcam and microphone hardware are used to supplement the processing capabilities and network access provided by the PC. In addition, the videophone architecture 1500 shown in FIG. 15 is typically implemented in software to provide a "soft" videophone that runs as an application on the PC.

In another alternative illustrative embodiment, an arbitrary or predetermined image, effect, or pattern may be used to replace the remaining portion of a captured video image (i.e., the portion of the captured video image other than the target portion that is kept in focus). Instead of blurring pixels in the remaining portion by increasing their circle of confusion to thereby render the remaining portion indistinct as described above, all or part of the remaining portion may be replaced, for example, with a featureless image. The featureless image may be arranged with an arbitrary or user selectable color, for example, that would make the videophone user appear to be sitting in front of a plain wall. In other examples, an arbitrary or user selectable image is selected such as a photograph or illustration. For example, a garden photograph may be selected to provide background scenery for the videophone user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A videophone, comprising:
   a camera arranged for capturing a video image comprising a plurality of pixels; and
   an image processing module arranged for applying privacy filtering to the video image to simulate a depth of field effect, the privacy filtering including
   (a) segregating a portion of the video image, and (b) blurring the segregated portion of the video image by increasing the circle of confusion associated with the segregated portion of the video image.

2. The videophone of claim 1 in which the image processing module blurs the segregated portion of the video image using one of mean filter, median filter, or Gaussian filter that is applied to pixels in the segregated portion of the video image in a spatial domain.

3. The videophone of claim 1 in which the image processing module blurs the segregated portion of the video image using one of low pass filter or Gaussian filter that is applied to pixels in the segregated portion in order to increase the circle of confusion associated with the segregated portion of the video image in a frequency domain.

4. The video phone of claim 1 in which the blurred portion of the video image is combined with at least a portion of an unblurred portion of the video image to generate a composite video image.

5. The videophone of claim 1 in which the image processing module is implemented in one of software application, firmware, hardware, or a combination thereof.

6. The videophone of claim 1 in which the size or shape of the segregated portion of the video image that is blurred is selected from one or more templates.

7. The videophone of claim 1 further including a user interface arranged for selectable control over the privacy filtering.

8. The videophone of claim 7 in which the user interface is arranged for enabling and disabling the privacy filtering.

9. The videophone of claim 7 in which the user interface is arranged for selecting an extent to which the segregated portion of the video image is blurred.

10. The videophone of claim 7 in which the user interface is arranged for selecting a size or shape of the segregated portion of the video image that is blurred.

11. A computer-readable medium containing instructions which, when executed in one or more processors disposed in an electronic device, performs a method for providing privacy to a videotelephony call, the method comprising the steps of:
    capturing a video image with a videophone camera;
    applying an object detection algorithm to segregate a target portion of the video image from a remaining portion of the video image;
    digitally filtering the remaining portion of the video image by increasing the circle of confusion associated with the remaining portion to provide privacy for subject matter contained therein; and
    compositing the target portion with the filtered remaining portion to generate a composite video image.

12. The computer-readable medium of claim 11 further including a step of transmitting the composite video image to a videophone on a remote end of the videotelephony call.

13. The computer-readable medium of claim 12 in which the transmitting is in a format that utilizes video compression, the format being selected from one of MPEG, MPEG-1, MPEG-2, MPEG-4, MPEG-7, MPEG-21, VC-1, DV, DivX, ITU H.261, TTU H.263, ITU H.264, WMV, Real Media, Real Video, QuickTime, ASF, AVI, 3GPP, 3GPP2, JPEG, or motion-JPEG.

14. The computer-readable medium of claim 11 in which the digital filtering comprises applying a convolution operator in one of spatial domain or frequency domain.

15. The computer-readable medium of claim 11 in which the digital filtering comprises applying an image in place of the remaining portion of the video image, the image being selected from one of illustration, pattern, featureless image, colored image, photograph or illustration.

16. A method for simulating depth of field effects in a video image, the method comprising the steps of:
    utilizing an image sensor to capture the video image having a substantially infinite depth of field;
    spatially segregating a portion of the video image into an image buffer;
    applying image processing to the segregated video portion to increase a circle of confusion associated with the segregated portion so as to shorten an apparent depth of field of the video image; and
    refreshing the image buffer with the image-processed video portion.

17. The method of claim 16 in which the spatial segregation is performed using an object detection technique to dynamically locate and track a portion of interest in the video image.

18. The method of claim 17 in which the object detection technique is selected from one of feature-based approach or image-based approach.

19. The method of claim 16 in which the image sensor is a CCD array that is small relative to an associated image sensor lens aperture.

20. The method of claim 19 in which the lens is arranged to provide a fixed focal length.

* * * * *